Figure 1:
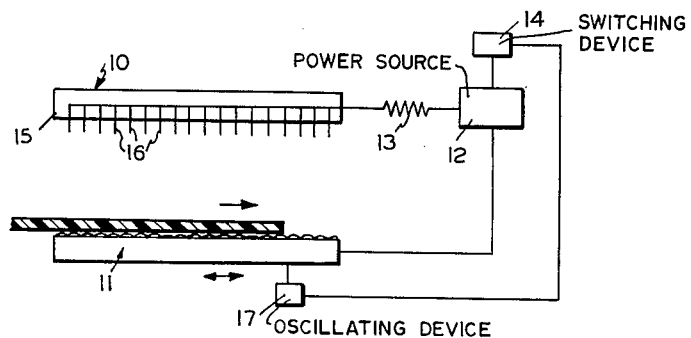

Aug. 3, 1965  K. G. ANDERSON  3,198,409
METHOD FOR TRANSPORTING DIELECTRIC MATERIAL
Filed Sept. 16, 1963

United States Patent Office 3,198,409
Patented Aug. 3, 1965

3,198,409
METHOD FOR TRANSPORTING DIELECTRIC MATERIAL
Kelvin G. Anderson, Greer, S.C., assignor to W. R. Grace & Co., Duncan, S.C., a corporation of Connecticut
Filed Sept. 16, 1963, Ser. No. 309,082
7 Claims. (Cl. 226—1)

This invention relates to methods and means for transporting dielectric materials, especially organic thermoplastic sheets or films. In particular, it relates to methods and devices for conveying organic thermoplastic sheets or films over a surface while the surface remains substantially stationary relative to the material being transported.

It is a general object of this invention to provide novel methods for transporting dielectric materials. A specific object is to provide novel methods for transporting organic thermoplastic sheet or films. Another object is to provide methods for transporting such materials over a surface which remains essentially stationary with respect to the material transported thereover. Still another object is to provide methods of transporting dielectric materials, especially organic thermoplastic sheets or films over a surface which remains essentially stationary with respect to the material transported thereover. A further object of the invention is to provide apparatus for performing the methods of the invention.

Still further objects and advantages of the invention will become apparent to those skilled in the art after consideration of the following detailed description thereof.

It has been discovered that dielectric materials, e.g., organic thermoplastic films, can be transported by establishing a high voltage potential between a pair of spaced, parallel electrodes, bringing the material to be transported into the space between the electrodes, repeatedly and concurrently reversing the polarity of the electrodes and simultaneously oscillating one electrode synchronously with the reversal of polarity. The oscillating electrode should be of a size sufficient to support the material being transported thereover. The other or stationary electrode should be of a size and design to apply a substantially uniform electrostatic charge on the surface of the material facing that electrode.

It has further been found that dielectric materials such as organic thermoplastic films can be transported by establishing a high voltage potential between a spaced pair of parallel electrodes, one of said electrodes having a multiplicity of uniformly distributed filamentous strands projecting above its surface towards the other electrode, at least the outer portion of the free extremities of which are biased at an angle other than normal to the plane of said one electrode, placing the material upon the surface of the multiple filamentous strands, and repeatedly and concurrently reversing the polarity of the respective electrodes.

The apparatus of the invention comprises in the first instance (oscillating transportation) an oscillating electrode, a stationary electrode spaced therefrom and parallel thereto, means to establish a high voltage potential between the electrodes, means to oscillate the first named electrode, means to repeatedly and concurrently reverse the polarity of the electrodes and means to synchronize the oscillation of the first electrode with the reversal of electrode polarities.

In the alternative embodiment (bent filaments) the apparatus includes a first electrode above which projects a multiplicity of normally upstanding filamentous strands at least the outer free extremity of each of which is biased at an angle other than normal to the plane of the said electrode; a second electrode parallel with and spaced above the said strands on said first electrode, means to establish a high voltage potential between the two electrodes and means to repeatedly and concurrently reverse the polarity of the electrodes.

Figure 2:
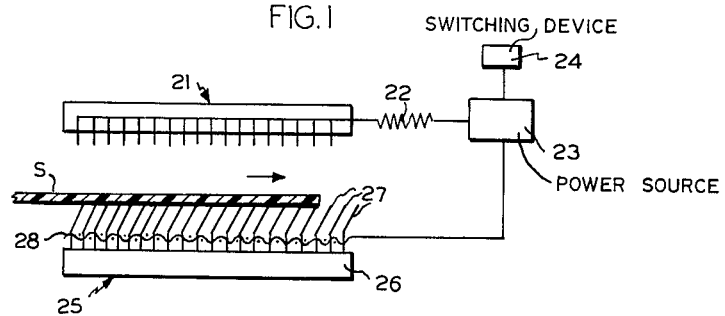
Figure 3:
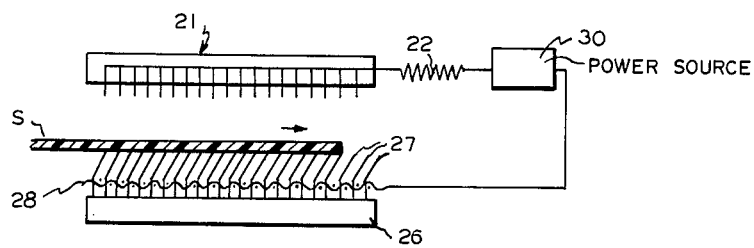

Reference will now be made to the drawings, in which:
FIGURE 1 is a schematic illustration of one embodiment of the invention.
FIGURE 2 is a schematic illustration of a second embodiment of the invention.
FIGURE 3 is a schematic illustration of a variation of the embodiment illustrated in FIGURE 2.

The device illustrated in FIGURE 1 includes a first electrode assembly 10, a second electrode 11 and a high voltage direct current power source 12. The electrodes are connected by suitable leads to the power source so as to be of opposite polarity. Preferably, a high value resistor 13 is connected in series with the electrode assembly 10 to limit current drawn to the electrodes and to prevent arcing across the gap between the electrodes. An electronic switching device 14 of known construction is used to repeatedly and concurrently reverse the polarity of the terminals of the power supply and thus, in turn, reverse the polarity of the respective electrodes.

In the illustrated device the top electrode assembly 10 comprises a plate 15 of dielectric material (e.g. Lucite) in which there is mounted a plurality of pointed electrodes 16, each pointing toward the lower electrode. The exact number of pointed electrodes are not critical so long as a fairly uniform electrostatic force field is generated by the assembly. Greater uniformity of the field and further protection against arcing can be promoted by connecting a high value resistor in series with each pointed electrode and then connecting the entire assembly with the power source. Adequate uniformity and minimal opportunity for arcing is, however, provided by connecting the electrodes in series and then to the power source via a single high value resistor 13, as shown.

The lower electrode 11 is illustrated as being a solid plate of conductive material, e.g., metal. At least the upper surface of the plate is knurled or roughened to reduce opportunity for electrostatic adhesion of material thereto. The plate and especially the upper surface thereof may, if desired, be coated with a thin layer of polyethylene, polypropylene or other like electrical insulating material. The electrode 11 may, if desired, be a reticular plate or may be a taut mesh structure. In all cases it must be composed of conductive material such as metal.

Electrode 11 is oscillated in a desired line of travel by an oscillating device of known construction and mode of operation, designated schematically as 17 in FIGURE 1. The switching device 14 and the oscillating device 17 are electrically or mechanically connected in any suitable manner so that electrode 11 will always be moving in one direction just after the potential between the two electrodes goes through a null value during the polarity reversal of the electrodes.

In operation, a sheet of thermoplastic film (for example) is placed on the oscillating electrode 11. The potential between the electrodes places a heavy electrostatic charge on the film, pinning it to the surface of the lower electrode 11. Now, let us say, as the electrode 11 moves from left to right in its oscillatory cycle, the film is moved a corresponding distance. If the polarity of the electrodes is now reversed, the charge on the film sheet will also reverse at some point during the rise of the reversed high voltage pulse. At this instant the plastic film sheet moves slightly away from the surface of the electrode 11. At this time the latter should begin its movement from right to left in its oscillatory cycle. In a short time the charge on the film sheet is also reversed so that the sheet is once more attracted to the electrode 11, which is now moving from left to right so that the film sheet is again transported in the same direction. Continuous repetition of the above action quickly transports the sheet across the electrode 11 while the electrodes remain in a substantially fixed position.

The potential to be established may suitably range from about 5 to about 50 kilovolts depending primarily upon the spacing between the two electrodes. Other factors of less importance include the specific dielectric material from which the sheet to be transported is made, the humidity of the surrounding atmosphere and the combined thickness of the coating (if any) on electrode 11 and the sheet. A few relatively simple empirical tests will suffice to establish minimum and/or optimum potential for any particular situation. The potential is in all cases preferably maintained at the lowest possible value in order to eliminate the possibility of arcing between the electrodes.

In the device of FIGURE 2 the upper electrode assembly 21, resistor 22, power source 23 and switching device 24 can suitably be identical to the corresponding elements 10, 13, 12, 14 described above with reference to FIGURE 1. The lower electrode assembly is, however, quite different. In this device the lower electrode assembly 25 comprises a plate 26 to which there is secured a multiplicity of uniformly distributed upstanding filamentous strands 27. A wire mesh 28 is threaded through these strands. Tension is applied in suitable manner to the end of the mesh, so that the free extremities of the strands 28 are bent at an angle other than normal to the plane of plate 26. The mesh is then connected to one of the terminals of the power supply. Use of the wire mesh facilitates changing the direction of the bend in the filamentous strands. In those cases where a single line of travel is sufficient an alternate construction would have filamentous strands permanently bent in this direction and the plate 26 to which the strands are secured would serve as the electrode.

In operation of the device illustrated in FIGURE 2 a sheet of organic thermoplastic film, for example, is placed on top of the bent filamentous strands. When a high voltage potential is established between the electrodes the sheet is pressed down and in turn further bends the strands in the direction in which they have been biased, transporting the film forward in the direction of the bend. When polarity of the electrodes is reversed there is a point in time when there is effectively no charge on the film. As a result the film lifts, pressure on the strands is released and they return to their original position. As the film becomes oppositely charged it again presses down on the bent filaments and is moved further forward. Continuous repetition of the polarity reversal transports the sheet across the electrode assembly 25 while this assembly nevertheless remains stationary.

As previously described, the potential between the electrodes 21, 25 can vary over a range of from about 5 to about 50 kilovolts depending upon the spacing, the material being transported, the humidity of the surrounding atmosphere, etc.

The device illustrated in FIGURE 3 is essentially the same as that shown in FIGURE 2, the sole difference residing in the use of a high voltage alternating current power source 30, in lieu of the direct current source 23 and switching device 24. Operation is the same in both devices.

While alternating current power sources are satisfactory for purposes of the invention it is generally preferred to use pulsating direct current, as described with reference to FIGURES 1 and 2. Pulsating direct current permits better control of the operation and in addition permits greater transportation speeds in almost all cases because of faster cycles in reversing polarity of the electrodes.

Practice of the invention is illustrated by, but should not be limited to the following specific example.

*Example 1*

A device was constructed in the manner illustrated in FIGURE 3.

The power source was a commercially available neon exciter transformer having an alternating current output of 15 kilovolts.

The lower electrode assembly included an ordinary shoe brush. A 60 mesh wire screen was threaded through the bristles of the brush. The screen was electrically connected to one of the transformer terminals. It was also pulled to one end of the brush, while the brush handle was restrained, to bend the brush bristles towards one end of the brush.

The upper electrode assembly was a Lucite plate through which there protruded about 20 pointed electrodes (phonograph needles). The electrodes were connected together in series and then the unit was connected to the power source via a 200 megohm resistor. The space between the points and the top of the brush bristles was approximately one inch.

A piece of commercially available polyethylene film (about .001 inch thick) was placed on top of the brush bristles. When the power source was turned on, the film moved across the surface of the brush bristles in the direction of the bend.

The screen was then released, and tension was applied first to one side of the brush and later to the opposite end of the brush. In each case, after the power supply was turned on, the film moved across the surface of the bristles in the direction to which they had been bent.

Film transport speeds in this experiment were up to 5 feet per minute. Much faster speeds are possible by replacing the alternating current power supply with a high voltage pulsating direct current power supply.

The invention is useful for transporting virtually any dielectric material including, but not limited to, organic thermoplastic polymeric films and sheets made of polyethylene, polypropylene, polystyrene, polyvinylchloride, polyethylene terephthalate, polyvinylidene chloride, vinylidene chloride copolymers, vinyl chloride copolymers, polyamides including nylon, and the like. The invention is also useful for transporting films and sheets of regenerated cellulose and cellulose derivatives, of various electrically insulating glass compositions and of other like materials. The thickness of the sheet or film can suitably vary up to about one inch or so.

The foregoing description has by necessity been quite detailed. A number of modifications, variations and/or rearrangements will be evident to those skilled in the art, and should therefore be considered as falling within the spirit and scope of the invention as it is defined in the appended claims.

What is claimed is:

1. Method for electrostatically transporting an unrestrained sheet of dielectric film material comprising:
    (a) placing said film between a pair of spaced apart parallel electrodes.
    (b) electrostatically charging said film by establishing a high voltage potential between said electrodes thereby attracting said film to one of said electrodes,
    (c) discontinuing said film attraction for said electrode by reversing the polarity of said electrodes thereby permitting the film to lift slightly from the attracting electrode toward the other electrode,
    (d) oscillating the attracting electrode backward and forward in the desired line of travel,
    (e) synchronizing said electrode oscillation with the reversal of polarity so that the attracting electrode is moved forward a small finite distance when said film is attracted thereto and backward when said film has lifted thereby producing a positive forward movement and
    (f) repeating steps (b), (c) and (d).

2. The method of claim 1 wherein said film is an organic thermoplastic film.

3. The method of claim 1 wherein said potential is in the range of 5 to 50 kilovolts.

4. Method for electrostatically transporting an unrestrained sheet of dielectric film material comprising:
   (a) placing said film on a multiplicity of upstanding filamentous strands and between a pair of spaced apart parallel electrodes,
   (b) bending the outer free extremities of said filaments at an angle in the direction of desired travel,
   (c) electrostatically charging said film by establishing a high voltage potential between said electrodes thereby attracting said film to the electrode adjacent said filaments and further depressing said filaments in the direction of desired film travel,
   (d) discontinuing said film attraction for said electrode by reversing the polarity of said electrodes thereby permitting said film to lift slightly from the filaments so that said filaments return to the angle attained prior to depression without moving said film backward and
   (e) repeating steps (c) and (d).

5. The method of claim 4 wherein said potential is in the range of 5 to 50 kilovolts.

6. The method of claim 4 wherein said potential is applied by an alternating electrical current.

7. The method of claim 4 wherein said potential is applied by a pulsating direct electrical current.

References Cited by the Examiner

UNITED STATES PATENTS

| | | | |
|---|---|---|---|
| 287,957 | 11/83 | Osborne | 266—1 |
| 1,706,741 | 3/29 | Pugh | 226—8 |
| 2,327,695 | 8/43 | Beregh | 317—2 |
| 2,539,163 | 1/51 | Robinson | 317—2 |
| 2,752,533 | 1/56 | Maas | 317—2 |
| 2,850,908 | 9/58 | Foster | 317—262 X |
| 2,923,235 | 2/60 | Voegelin | 271—32 X |
| 2,956,718 | 10/60 | Beveridge | 226—94 X |

ROBERT B. REEVES, *Primary Examiner.*

RAPHAEL M. LUPO, *Examiner.*